United States Patent Office 3,014,028
Patented Dec. 19, 1961

3,014,028
18-NOR-STEROIDS
Leopold Ruzicka, Zurich, Rudolf Anliker, Binningen, and Hans Heusser, Kreuzlingen, Switzerland, assignors to Ciba Pharmaceutical Products Inc., Summit, N.J.
No Drawing. Filed July 10, 1957, Ser. No. 670,864
Claims priority, application Switzerland July 13, 1956
2 Claims. (Cl. 260—239.55)

This invention relates to new 18-nor-steroids and to a process for their manufacture, especially 18-nor-progesterone and 18-nor-13:17-dehydro-progesterone. The new 18-nor-steroids can be used as medicaments or as intermediates for the manufacture of other important, physiologically active steroids. 18-nor-progesterone and 18-nor-13:17-dehydro-progesterone are distinguished by a pronounced progestative effect and thus can be used for instance in disturbances of the normal sexual cycle of the female.

The inventive idea of the new process resides in preparing hydro-phenanthrene-2-ones having the following partial formula showing ring C

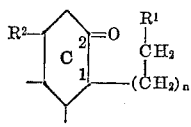

in which $R^1$ indicates an activating residue and $R^2$ is a hydrogen atom or a free or functionally converted hydroxyl or oxo group and $n$ indicates the number 2 or 3, which are then condensed to 18-nor-steroids of the partial formula

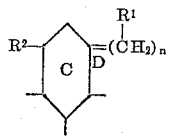

and, if desired, in the resulting compounds, the 13:17-double bond is saturated with hydrogen and/or a free or functionally converted carboxyl group in 17- or 17a-position converted into the acetyl or a free or esterified hydroxyl acetyl group.

As starting materials there are used especially compounds of the formula

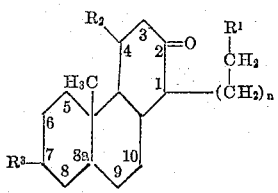

in which $n$ is 2 or 3 and $R^1$ is an activating residue, for example a free or functionally converted, carboxyl group e.g. an esterified carboxyl group, a nitrile or carboxylic acid amide group or an acetyl or a free or substituted hydroxyacetyl group, especially an esterified hydroxy acetyl group, $R^2$ is a hydrogen atom or a free or functionally converted hydroxy or oxo group, for example an esterified hydroxyl group, and $R^3$ is a free or functionally converted hydroxyl or oxo group, for example an esterified or etherified hydroxyl group or a ketalized oxo group, or the corresponding compounds unsaturated in the steroid nucleus.

The compounds unsaturated in the ring system can contain one or more double bonds, preferably a double bond proceeding from the carbon atom 8a. The starting materials can be obtained from the 2-methylene-hydrophenanthrenes having formulae analogous to those mentioned above in which the 2-oxo-group is substituted by a methylene grouping $=CH_2$, which compounds are described in copending application Serial No. 615,030, filed October 10, 1956, by Leopold Ruzicka et al., by treatment with oxidizing agents. The oxidative splitting of the methylene double bond takes place by direct hydroxylation with osmium tetroxide or by epoxylation with per-acids and hydrolysis and subsequent glycol-splitting with lead tetra-acetate or periodic acid, by ozonization and splitting of the ozonides, or by oxidation with potassium permanganate.

The condensation, according to the invention, of the hydrophenanthrene-2-ones to the 13:17-unsaturated 18-nor-steroids takes place in the presence of catalysts or condensing agents in a suitable solvent, for example in the presence of strongly alkaline condensing agents, such as alkali metal hydroxides or alcoholates, amides or hydrides, such as potassium hydroxide, sodium ethylate, sodamide or sodium hydride, or in the presence of catalysts such as piperidine acetate or benzoate or triethylamine benzoate in an inert solvent, for example, dioxane, benzene, toluene or xylene.

Any saturation of the 13:17-double bond of the resulting 18-nor-steroids that is required, can take place by chemical or bio-chemical methods. For the chemical reduction, catalytically activated or nascent hydrogen can be used. Accordingly, this double bond can be reduced, for example by hydrogenation is the presence of a palladium catalyst or by the action of alkali metals, especially lithium, in liquid ammonia or a low aliphatic amine, such as methylamine or ethylamine.

For the conversion of a free or functionally converted carboxyl group in 17- or 17a-position into the acetyl or hydroxyacetyl group, various methods are available. Thus, the corresponding acid halides can be reacted with diazomethane or alternatively methyl metal compounds can be reacted upon functional derivatives of the acids, such as halides, esters, acid amides or nitriles.

The reaction of the acid halides with diazomethane can be carried out with an excess of the latter, as a result of which, with splitting out of hydrogen halide, the diazoketones are obtained. If, on the other hand, the diazomethane solution is gradually added to the acid halide, the hydrogen halide liberated in the condensation reacts with intermediately produced diazoketone, so that the corresponding halogen ketone is produced.

For the formation of hydroxy ketones, resulting diazoketones, in the crude state or after separation and purification, are treated with hydrolyzing agents, for example with water or dilute acids, for example sulfuric acid, or with organic sulfonic acids, such as methane sulfonic acid or toluene sulfonic acid. Esters of the hydroxy ketones can be obtained by reaction of the diazo ketones with organic or inorganic acids containing very little water, for example with acetic acid or with propionic acid, butyric acid, trimethylacetic acid, crotonic acid, enanthic acid, palmitic acid, benzoic acid, phenyl-acetic acid, β-phenylpropionic acid, β-cyclopentylpropionic acid, hydrochloric, hydrobromic or hydriodic acid, phosphoric acid or boric acid. When as intermediate products halogen ketones are formed, these can be converted by alkaline agents, for example with bicarbonates, into the free hydroxy ketones or by means of salts of the above specified acids into the esters thereof. The hydroxy ketones and their esters are obtained from the methyl ketones by direct or indirect methods. Thus, they are obtained by the action of suitable oxidizing agents, for example lead tetraacylates, such as lead tetraacetate, or aryl iodoso acylates. However, the methyl ketones can also be directly or indirectly (by way of the 21-oxalyl derivatives)

halogenated in 21-position and the resulting halogen-ketones converted by the above methods into the hydroxy ketones or their esters. The methyl ketones can be obtained from the diazo-ketones by reduction with metals, for example, zinc, copper, magnesium or alloys thereof in the presence of a wide variety of solvents, such as alcohols, aqueous alcohols, lower aliphatic acids, hydrohalic acids or alkalis.

The specified acid halides can also be reacted with methyl-metal compounds, for example those of magnesium cadmium and zinc; there may also be mentioned compounds of mercury, copper, aluminum, tin and the alkali metals. In this manner the methyl ketones are obtained, which can be converted into hydroxy methyl ketones as above described.

When acid esters are reacted with the methyl-metal compounds, then from the carbinols intermediately produced there are obtained by splitting out water compounds having a methylene grouping on the carbon atom 20. By the action of oxidizing agents, this grouping can be replaced by an oxo group. In this connection there may be mentioned by way of example oxidation by a compound of hexavalent chromium, such as chromic acid, by permanganate, by ozonization and splitting of the ozonides, by the action of peroxides such as perbenzoic acid, mono-perphthalic acid or hydrogen peroxide, advantageously in the presence of osmium tetroxide, and the splitting of the glycols produced either by the hydrolysis of the oxide rings or by direct attachment of two hydroxyl groups to each double bond, effected, for example, by means of lead tetraacetate or periodic acid.

As a result of the reaction of the nitriles with methyl-metal compounds, imino compounds are obtained which, by the action of hydrolyzing agents, are converted into ketones.

If it is the intention to produce an oxo group in the ring A, a corresponding esterified hydroxyl group can be converted into such group for example by hydrolysis by means of alkali metal bicarbonates, carbonates or hydroxides and subsequent oxidation, for example with a compound of hexavalent chromium, such as chromium trioxide in glacial acetic acid or chromium trioxide-pyridine complex, or by means of a metal alcoholate or phenolate in the presence of ketones such as acetone or cyclohexanone; alternatively a ketalized oxo group can, by splitting with aqueous acids, be converted into a free oxo group.

Protected hydroxyl or oxo groups are finally liberated, if this has not already taken place in the course of other reactions. Thus, for example, ketals and acetals, both open-chain and cyclic, for example ethylene ketals, can be split by treatment with mineral acids or sulfonic acids at room temperature, advantageously in the presence of a ketone, such as acetone or pyruvic acid, or also by gentle heating with dilute acetic acid. Under the same acid conditions, enol ethers or tetrahydropyranyl ethers are also split. Benzyl ethers can in addition be easily split with hydrogen in the presence of a catalyst, for example palladium on carrier substances, such as animal charcoal or alkaline earth carbonates.

If it is required to introduce a double bond in 1:2- and/or 4:5-position, this can be effected in the customary manner, for example by halogenation of the 3-ketone and subsequent splitting off of hydrogen halide, or by dehydrogenation of the 3-ketone with a selenium compound having a dehydrogenating action, especially with selenium dioxide or selenious acid, advantageously in the presence of a tertiary alcohol such as tertiary butanol or amylene hydrate.

Finally, the resulting products, especially the 18-nor-20-oxo-21-hydroxypregnenes, can be converted in known manner into their esters. In these esters and/or enol esters, the acid residues are derived from any organic or inorganic acids, such as aliphatic, alicyclic, araliphatic, aromatic or heterocyclic carboxylic, thion-carboxylic, thiol-carboxylic or sulfonic acids, preferably formic acid, acetic acid, chloracetic acid, trifluoracetic acid, propionic acid, butyric acids, valeric acids, trimethylacetic acid, caproic acids, enanthic acids, caprylic acids, palmitic acids, undecylenic acid, β-cyclopentylpropionic acid, hexahydrobenzoic acid, benzoic acid, phenyl acetic acid, cyclohexylacetic acid, phenylpropionic acids, furane carboxylic acid, sulfuric acids or phosphoric acids.

The products of the process are 18-nor-steroids, saturated or unsaturated in the ring system, with the following partial formula showing rings C and D

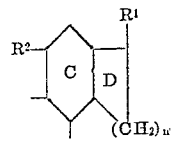

especially compounds of the formula

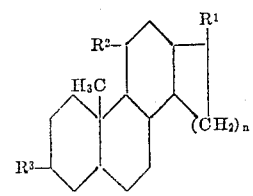

in which $n$ is 2 or 3, $R^1$ is a free or functionally converted carboxyl group, such as an esterified carboxyl group, a nitrile group or a carboxylic acid amide group, or an acetyl or hydroxyacetyl group with free or substituted, especially esterified, hydroxyl group, $R^2$ is a hydrogen atom or a free or functionally converted, for example esterified, hydroxyl group or an oxo group and $R^3$ is a free or functionally converted hydroxyl or oxo group, for example an esterified or etherified hydroxyl group or a ketalized oxo group, and their derivatives unsaturated in the ring. The compounds unsaturated in the ring system have the double bond especially in 4:5-, or 5:6- and/or 13:17-position.

The new compounds can be used as medicaments, for example, in the form of pharmaceutical preparations which contain them in admixture with a non-toxic, therapeutically useful pharmaceutical organic or inorganic solid or liquid carrier material suitable for enteral or parenteral or local application. For the production of these preparations such substances are concerned as do not react with the new compounds, as for example water, gelatine, lactose, starch, magnesium stearate, talc, vegetable oils, benzyl alcohols, gums, polyalkylene glycols, Vaseline, cholesterol, or other known medicament carriers, the pharmaceutical preparations can take the form of, for example, tablets or dragées, salves, creams, or are in liquid form as solutions, suspensions or emulsions. They are sterilized if desired, and/or may contain auxiliary substances such as preservatives, stabilizing, wetting or emulsifying agents, salts which vary the osmotic pressure or buffer substances. They may also contain other therapeutically valuable substances. The pharmaceutical preparations are formulated by the usual methods.

The invention is illustrated by the following examples:

*Example 1*

100 mg. of $\Delta^{8a}$-1β-(γ'-cyanopropyl)-4bβ-methyl-7:7-ethylenedioxy - 1:2:3:4:4aα:4b:5:6:7:8:10:10aβ - dodecahydrophenanthrene-2-one of M.P. 135° C., under a nitrogen atmosphere, are left to stand for 1 hour together with 20 cc. of 0.5 N-alcoholic sodium ethylate solution and the mixture subsequently boiled under reflux for 3 hours. The cold reaction solution is poured on ice and extracted with chloroform. The oily residue of the chloroform extract (87 mg.) is chromatographed on aluminium oxide (activity III). With benzene-petroleum ether (1:4), 53 mg. of $\Delta^{5:13:17}$-3:3-ethylenedioxy-18-nor-etiadienic acid nitrile of M.P. 150° C. can be eluted. The pure nitrile obtained of M.P. 173° C. shows in the ultra violet absorption spectrum a maximum at 227mμ (log $a$=4.13), $[\alpha]_D^{22}$=—97° (chloroform). In the infra red absorption spectrum, bands are visible at 2220 cm.$^{-1}$ ($\alpha,\beta$-unsaturated nitrile) and at 1645 cm.$^{-1}$ (13:17-double bond). As condensing agent there can also be used especially sodium-tertiary-amylate in benzene.

The starting material used above can be prepared, for example starting from $\Delta^{8a}$-1$\beta$-($\gamma'$-cyanopropyl)-2-methylene - 7:7 - ethylene-dioxy-4b$\beta$-methyl-1:2:3:4:4a$\alpha$:4b:5: 6:7:8:10:10a$\beta$-dodecahydrophenanthrene by either of the following two processes:

(a) 500 mg. of $\Delta^{8a}$-1$\beta$-($\gamma'$-cyanopropyl)-2-methylene-7:7 - ethylene - dioxy-4b$\beta$-methyl-1:2:3:4:4a$\alpha$:4b:5:6:7: 8:10:10a$\beta$-dodecahydro-phenanthrene, described in copending application Serial No. 615,030, filed October 10, 1956, by Leopold Ruzicka et al. are dissolved in 2 cc. of pyridine and 8 cc. of absolute chloroform (stabilized with 1 percent of ethanol). A stream of ozone is passed through the solution at —15 to —18° C. while it is being well stirred. The stream of ozone is accurately metered and 21.35 mg. of ozone are introduced per minute. After 200 seconds (=2 equivalents of ozone), the ozonization is interrupted and the reaction vessel rinsed with nitrogen for 10 minutes. The product is then diluted with 16 cc. of a mixture, cooled to —15° C., of 4 cc. of water, 8 cc. of pyridine and 4 cc. of glacial acetic acid, and about 1 gram introduced of zinc dust activated with dilute acetic acid, the introduction being made whilst stirring strongly. After 15 minutes, the cold reaction mixture (—15° C.) is immediately filtered. The residue is thoroughly washed with benzene. The organic phase is washed in turn three times with water, twice with saturated sodium bicarbonate solution and three times with water, dried and carefully evaporated under vacuum. The crystalline residue (520 mg.) is chromatographed on aluminium oxide (activity III). With benzene-petroleum ether (4:1) 53 mg. of unchanged starting material of M.P. 138–139° C. can be eluted, while the benze fractions yield 432 mg. of pure $\Delta^{8a}$-1$\beta$-($\gamma'$ - cyanopropyl) - 4b$\beta$-methyl-7:7-ethylenedioxy-1:2: 3:4:4a$\alpha$:4b:5:6:7:8:10:10a$\beta$ - dodecahydropenanthrene-2-one of M.P. 137° C. $[\alpha]_D^{22}$=—47° (chloroform). In the infra red absorption spectrum, the following bands can be observed: 1712 cm.$^{-1}$ (6-ring ketone); 2240 cm.$^{-1}$ (aliphatic nitrile).

(b) Into a solution of 103 mg. of $\Delta^{8a}$-1$\beta$-($\gamma'$-cyanopropyl - 2 - methylene-7:7-ethylenedioxy-4b$\beta$-methyl-1:2: 3:4:4a$\alpha$:4b:5:6:7:8:10:10a$\beta$ - dodecahydrophenanthrene in 1.5 cc. of anhydrous benzene 77 mg. of osmium tetroxide are introduced. The solution is allowed to stand for 12 hours, then diluted with 7 cc. of ethanol, 0.7 gram of sodium sulphite in 4 cc. of water added and the whole shaken for 4 hours at room temperature and filtered through Celite. The filtrate is concentrated under vacuum and extracted with chloroform. The residue of the chloroform extract (104 mg.) crystallizes from methanol-water. The pure glycol melts at 194° C., $[\alpha]_D^{22}$=44° (chloroform).

The crude glycol (104 mg.) is dissolved in a mixture of 12 cc. of methanol and 3 cc. of pyridine and after the addition of 500 mg. of periodic acid in 2 cc. of water, the whole is allowed to stand for 30 minutes at room temperature. The reaction mixture is diluted with water and extracted with chloroform. The crude compound obtained after evaporation of the solvent (92 mg.) melts at 129° C. After recrystallizing three times, the melting point rises to 137° C. The resulting $\Delta^{8a}$-1$\beta$-($\gamma'$-cyanopropyl)-4b$\beta$-methyl-7:7-ethylenedioxy-1:2:3:4:4a$\alpha$:4b:5: 6:7:8:10:10a$\beta$-dodecahydrophenanthrene-2-one is identical in every respect with the compound obtained by ozonization.

Example 2

To a methyl magnesium bromide solution, prepared from 2.2 grams of magnesium, 10 grams of methyl bromide and 20 cc. of absolute ether, are rapidly added 277 mg. of the $\Delta^{5:13:17}$-3:3-ethylene-dioxy-18-nor-etiadienic acid nitrile, described in Example 1, in 20 cc. of ether. The reaction mixture is heated for 48 hours under reflux with exclusion of moisture and then cooled to 0° C. and decomposed by the dropwise addition of water. After the addition of ammonium chloride, the whole is extracted with chloroform. The yellow oily residue (310 mg.) is dissolved in 25 cc. of dioxane and 25 cc. of water and boiled for 5 hours under reflux. The reaction solution is concentrated under vacuum and extracted with chloroform. For purification, the residue is adsorbed on aluminium oxide (activity III). By means of petroleum ether-benzene (1:1) 193 mg. of pure $\Delta^{5:13:17}$-3:3-ethylene-dioxy-20-oxo-18-nor-pregnadiene are obtained.

$$[\alpha]_D^{22}=-76°$$

(chloroform), M.P. 135° C. In the ultra violet absorption spectrum the compound has a maximum at 256 mμ (log E=4.2). Infra red bands occur at 1622 and 1678 cm.$^{-1}$ ($\alpha,\beta$-unsaturated ketone).

Example 3

Carefully dried and pre-cooled ammonia gas is condensed in a three-necked flask. At —45° C. with brisk stirring, 250 mg. of clean metallic lithium are rapidly introduced into the liquid ammonia (300 cc.). Then a solution of 1 gram of the $\Delta^{5:13:17}$-3:3-ethylenedioxy-20-oxo-18-nor-pregnadiene, described in Example 2, in 50 cc. of ether is added dropwise to the dark blue lithium solution. The reaction mixture is thoroughly mixed at —45° C. for 2 hours and then poured out on to crushed ice. The organic fractions are extracted with ether. The crude product is adsorbed on aluminium oxide (activity III). The petroleum ether-benzene (1:1) fractions yield 763 mg. of $\Delta^5$-3:3-ethylenedioxy-20-oxo-18-nor-pregnene. In the infra red absorption spectrum, bands occur at 1715, 1223 and 1174 cm.$^{-1}$

In the resulting compound, the ketal group in 3-position can be split as follows:

500 mg. of $\Delta^5$-3:3-ethylenedioxy-20-oxo-18-nor-pregnnene are dissolved in 20 cc. of acetone, treated with 0.2 cc. of 2 N-hydrochloric acid and the whole heated for 15 minutes on the water bath. After dilution with water, the acetone is evaporated under vacuum and the residue extracted with ether. From methanol-water there can be crystallised in fine needles from the ether extract 415 mg. of pure $\Delta^4$-3:20-dioxo-18-nor-pregnene (18-nor-progesterone). In the ultra violet absorption spectrum, the compound shows a maximum at 240 mμ (log E=4.23). In the infra red absorption spectrum bands occur at 1672 and 1622 cm.$^{-1}$ ($\alpha,\beta$-unsaturated ketone) and 1715, 1220 and 1170 cm.$^{-1}$ (methyl ketone).

Example 4

600 mg. of $\Delta^{8a}$ - 1$\alpha$-($\delta'$-oxoamyl)-2-methylene-4b$\beta$-methyl - 7:7 - ethylenedioxy-1:2:3:4:4a$\alpha$:4b:5:6:7:8:10: 10a$\beta$-dodecahydrophenanthrene described in copending application Serial No. 615,030, filed October 10, 1956, by Leopold Ruzicka et al., are ozonized as described in Example 1. After chromatography on aluminum oxide (activity III) there can be isolated together with 153 mg. of starting material, 425 mg. of pure $\Delta^{8a}$-1$\beta$-($\delta'$-oxoamyl)-7:7 - ethylenedioxy-4b$\beta$-methyl-1:2:3:4:4a$\alpha$:4b:5:6:7:8: 10:10a$\beta$-dodecahydrophenanthrene-2-one of M.P. 181° C. $[\alpha]_D^{22}$=—71° (chloroform).

100 mg. of pure compound of M.P. 181° C. are allowed to stand in a nitrogen atmosphere for one hour together with 20 cc. of 0.5 N-alcoholic sodium ethylate solution and then the whole boiled for 3 hours under reflux. The cold reaction solution is poured on ice and extracted with chloroform. The residue is chromatographed on aluminum oxide. With petroleum ether-benzene (4:1), 67 mg. are obtained of the $\Delta^{5:13:17}$-3:3-ethylenedioxy-20-oxo-18-nor-pregnadiene, described in Example 2.

In an analogous manner $\Delta^{8a}$-1β-(E'-oxo-hexyl)-7:7-ethylenedioxy - 4bβ - methyl - 1:2:3:4:4aα:4b:5:6:7:8:10:10aβ-dodecahydrophenanthrene-2-one is obtained by ozonization of $\Delta^{8a}$ - 1β-(E'-oxo-hexyl -2-methylene-4bβ-methyl - 7:7 - ethylenedioxy - 1:2:3:4:4aα:4b:5:6:7:8:10:10aβ-dodecahydrophenanthrene. Cyclization of $\Delta^{8a}$-1β-(E'-oxo-hexyl)-7:7-ethylenedioxy-4bβ-methyl-1:2:3:4:4aα:4b:5:6:7:8:10:10aβ - dodecahydrophenanthrene - 2 - one with 0.5 N-alcoholic sodium ethylate solution yields $\Delta^{5:13:17a}$ - 3:3 - ethylenedioxy-20-oxo-18-nor-D-homo-pregnadiene.

Example 5

100 mg. of $\Delta^{8a}$-1β-(δ'-oxoamyl-7:7-ethylenedioxy-4bβ-methyl - 1:2:3:4:4aα:4b:5:6:7:8:10:10aβ-dodecahydrophenanthrene-2-one of melting point 210° C. are dissolved in 27 cc. of methanol and 3 cc. of water and, after the addition of 1.5 g. of potassium carbonate, refluxed in an atmosphere of nitrogen for 3 hours. The cold reaction solution is diluted with the same volume of water, and extracted with ether. The residue is chromatographed over alumina. With a mixture of petroleum ether and benzene, 44 mg. of pure $\Delta^{5:13:17}$-3:3-ethylenedioxy-20-oxo-18-nor-pregnadiene of melting point 144° C. are obtained.

Example 6

A solution of pure $\Delta^{8a}$-1β-(δ'-oxoamyl)-7:7-ethylenedioxy - 4bβ - methyl - 1:2:3:4:4aα:4b:5:6:7:8:10:10aβ-dodecahydrophenanthrene-2-one of melting point 201° C. in 10 cc. of isopropyl ether and 2 cc. of absolute benzene are refluxed for 2 hours over 500 mg. of alumina of activity I. The cold reaction mixture is filtered through Celite (diatomaceous earth—trademark) and evaporated under reduced pressure. The residue is chromatographed over alumina of activity III. The petroleum ether-benzene (1:1) fractions yield 23 mg. of $\Delta^{5:13:17}$-3:3-ethylenedioxy-20-oxo-18-nor-pregnadiene of melting point 143° C. which crystallizes from a mixture of acetone and hexane in the form of prisms. With benzene, 17 mg. of starting material are obtained.

What is claimed is:

1. The 3-ketal derivative of 13:17-dehydro-18-nor-progesterone of the formula

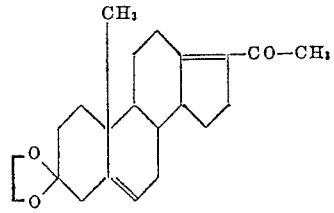

2. The $\Delta^{5:13:17}$-3:3-ethylenedioxy-18-nor-etiadienic-acid nitrile of the formula

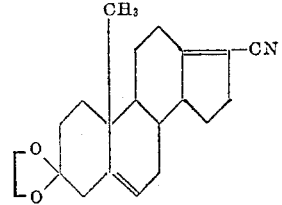

References Cited in the file of this patent
UNITED STATES PATENTS

| | | |
|---|---|---|
| 2,695,260 | Murray et al. | Nov. 23, 1954 |
| 2,744,122 | Djerassi et al. | May 1, 1956 |
| 2,759,951 | Djerassi et al. | Aug. 21, 1956 |

OTHER REFERENCES

"Journal of American Chemical Society" (1955), vol. 77, article by Sondheimer et al., pages 192–194.

UNITED STATES PATENT OFFICE
CERTIFICATE OF CORRECTION

Patent No. 3,014,028 December 19, 1961

Leopold Ruzicka et al.

It is hereby certified that error appears in the above numbered patent requiring correction and that the said Letters Patent should read as corrected below.

Column 2, line 30, for "is" read -- in --; column 5, line 42, for "benze" read -- benzene --; column 5, line 50, for "propyl-2-" read -- propyl)2- --; column 6, line 62, for "-1α-" read -- -1β- --; column 7, line 20, for "-oxoamyl-7:7-" read -- -oxoamyl)-7:7- --; line 22, for "210° C." read -- 201° C. --.

Signed and sealed this 16th day of October 1962.

(SEAL)
Attest:

ERNEST W. SWIDER
Attesting Officer

DAVID L. LADD
Commissioner of Patents